United States Patent
Agarwal et al.

(10) Patent No.: US 10,009,236 B2
(45) Date of Patent: *Jun. 26, 2018

(54) DETERMINING SAMPLING RATE FROM RANDOMLY SAMPLED EVENTS

(71) Applicant: International Business Machines Corporation, Armonk, NY (US)

(72) Inventors: Kanak B. Agarwal, Austin, TX (US); John B. Carter, Austin, TX (US); Colin K. Dixon, Austin, TX (US); Jeffrey T. Rasley, Providence, RI (US)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/176,316

(22) Filed: Jun. 8, 2016

(65) Prior Publication Data

US 2016/0294647 A1    Oct. 6, 2016

Related U.S. Application Data

(63) Continuation of application No. 14/034,862, filed on Sep. 24, 2013, now Pat. No. 9,401,853.

(51) Int. Cl.
*H04L 12/26* (2006.01)
*H04L 12/931* (2013.01)

(52) U.S. Cl.
CPC ............ *H04L 43/024* (2013.01); *H04L 43/04* (2013.01); *H04L 43/0894* (2013.01); *H04L 49/208* (2013.01)

(58) Field of Classification Search
CPC ...................................................... H04L 43/08
See application file for complete search history.

(56) References Cited

U.S. PATENT DOCUMENTS 7,536,455 B2    5/2009  Duffield et al.
7,738,613 B1    6/2010  Anderson et al.
(Continued)

FOREIGN PATENT DOCUMENTS

| CN | 101188531 A | 5/2008 |
| CN | 101697519 A | 4/2010 |
| TW | 201304464 A1 | 1/2013 |

OTHER PUBLICATIONS

International Search Report and Written Opinion dated Dec. 31, 2014 for International Application No. PCT/CN2014/087165, 12 pages.

(Continued)

*Primary Examiner* — Nicholas Taylor
*Assistant Examiner* — Sanjoy Roy
(74) *Attorney, Agent, or Firm* — Stephen J. Walder, Jr.; Mercedes L. Hobson

(57) ABSTRACT

Mechanisms are provided for determining an event rate. The mechanisms sample a sequence of events to generate a set of sampled events. At least a subset of the sampled events have associated event sequence values indicating a position of the sampled event within the sequence of events. The mechanisms group the sampled events into a plurality of event groups based on a common characteristic of the events. The mechanisms determine, for each event group, sequence values of sampled events associated with the event group. The mechanisms calculate, for each event group, an estimated event rate based on the sequence values of the sampled events associated with the event group and the total number of events in the sequence of events.

20 Claims, 5 Drawing Sheets

(56) References Cited

U.S. PATENT DOCUMENTS

| | | | |
|---|---|---|---|
| 7,821,959 B2 | 10/2010 | Imai | |
| 7,924,739 B2 | 4/2011 | Sen et al. | |
| 8,050,185 B2 | 11/2011 | Jorgensen et al. | |
| 8,085,766 B2 | 12/2011 | Kalkunte et al. | |
| 8,155,118 B2 | 4/2012 | Jorgensen | |
| 8,345,575 B2 | 1/2013 | Watanabe | |
| 9,203,711 B2 | 12/2015 | Agarwal et al. | |
| 9,401,853 B2 | 7/2016 | Agarwal et al. | |
| 2001/0055274 A1 | 12/2001 | Hegge et al. | |
| 2002/0156910 A1* | 10/2002 | Senda | H04L 29/06 709/231 |
| 2003/0179751 A1 | 9/2003 | Omae et al. | |
| 2005/0210533 A1* | 9/2005 | Copeland | H04L 63/1416 726/23 |
| 2006/0173992 A1* | 8/2006 | Weber | H04L 63/1425 709/224 |
| 2007/0041331 A1 | 2/2007 | Ma et al. | |
| 2007/0041332 A1* | 2/2007 | Jorgensen | H04L 41/142 370/252 |
| 2007/0047456 A1 | 3/2007 | Jorgensen et al. | |
| 2007/0160073 A1 | 7/2007 | Toumura et al. | |
| 2008/0008099 A1* | 1/2008 | Parker | H04L 47/10 370/235 |
| 2009/0080425 A1* | 3/2009 | Parker | H04L 12/4645 370/390 |
| 2009/0116402 A1* | 5/2009 | Yamasaki | H04L 1/20 370/253 |
| 2011/0026525 A1 | 2/2011 | He | |
| 2011/0199924 A1 | 8/2011 | Breslin et al. | |
| 2012/0113857 A1* | 5/2012 | Narayanaswamy | H04L 43/18 370/252 |
| 2015/0085694 A1 | 3/2015 | Agarwal et al. | |
| 2015/0089045 A1 | 3/2015 | Agarwal et al. | |
| 2016/0036659 A1 | 2/2016 | Agarwal et al. | |

OTHER PUBLICATIONS

U.S. Appl. No. 14/034,666.
U.S. Appl. No. 14/034,862.
U.S. Appl. No. 14/879,185.
"Catalyst Switched Port Analyzer (SPAN) Configuration Example", CISCO, Document ID: 10570, Updated Jul. 16, 2007; Accessed from the internet on Sep. 18, 2013; http://www.cisco.com/en/US/products/hw/switches/ps708/products_tech_note09186a008015c612.shtml, 39 pages.
"Configuring Port Mirroring", Juniper Networks, Published Jul. 31, 2013; Accessed from the Internet on Sep. 18, 2013, http://www.juniper.net/techpubs/en_US/junos/topics/usage-guidelines/policy-configuring-port-mirroring.html, 4 pages.

* cited by examiner

| DATA FLOW | SEQUENCE NUMBER |
|---|---|
| 1 | 1 |
| 1 | 2 |
| 2 | 1 |
| 1 | 5 |
| - | - |
| 2 | 3 |
| 3 | 7 |
| 1 | 7 |

QUANTUM 1

| DATA FLOW | SEQUENCE NUMBER |
|---|---|
| - | - |
| 3 | 13 |
| 3 | 17 |
| 1 | 24 |
| 2 | 10 |
| 2 | 13 |

QUANTUM 2

*FIG. 6*

DETERMINING SAMPLING RATE FROM RANDOMLY SAMPLED EVENTS

This application is a continuation of application Ser. No. 14/034,862, filed Sep. 24, 2013, status allowed.

BACKGROUND

The present application relates generally to an improved data processing apparatus and method and more specifically to mechanisms for determining a sampling rate from randomly sampled events.

In order to obtain information from network switches for purposes of measuring data flow characteristics, various techniques and protocols have been devised that can generally be classified into counter based and sampling based techniques/protocols. With regard to counter based techniques, each port of a switch may have one or more counters associated with it that measures the number of bytes, packets, or the like, that are sent and dropped since the switch was rebooted or the counter was reset. These port counters, while maintained on the application specific integrated circuit (ASIC) of the switch, and thus operating at high speed, must provide the counter value data to the general purpose processor of the switch for processing, which is typically done approximately every second. Moreover, this technique monitors a fixed number of ports on the switch and thus, is limited in the granularity of information provided.

Another counter based technique is provided by the NetFlow network protocol developed by Cisco Systems. The NetFlow protocol collects IP and other traffic information using a cache of current data flows, typically specified by a 5-tuple comprising source address, destination address, source port, destination port, and protocol. That is, when a data packet is received from a particular data flow, a lookup in the cache structure is performed to determine if an entry exists for that particular data flow (i.e. a flow of data packets over an established connection between a source device and a destination device) and if so, one or more counter values in the entry are updated to reflect the presence of the data packet. If an entry does not exist, then a new entry is created in the cache and counter values incremented accordingly. When the cache becomes full, an entry in the cache is evicted to a collector for storage and/or processing. Alternatively, a timer-based eviction may be used that events a cache entry, at best, approximately every 30 seconds. Because the NetFlow protocol is cache based, there is no fixed number of data flows that may be monitored contrary to port counters.

Still another counter based technique is provided in the OpenFlow protocol flow counters. OpenFlow is a protocol specification promulgated by the Open Networking Foundation (ONF) a user-led organization dedicated to promotion and adoption of software-defined networking (SDN) and which manages the OpenFlow standard. OpenFlow allows the path of network packets through the network of switches to be determined by software running on one or more controllers which program the switches with forwarding rules. This separation of the control from the forwarding allows for more sophisticated traffic management than is typically feasible using access control lists (ACLs) and routing protocols. The OpenFlow flow counters give bytes/packets sent at user specified granularities, e.g., per 5 tuple data flow specification, per source ID, etc. These flow counters can typically be read no faster than approximately once per second.

With regard to sampling techniques, sFlow is an industry standard technology promulgated by the sFlow.org consortium. The sFlow standard provides technology for monitoring high speed switched networks. With the sFlow standard, statistical sampling is performed in which 1-in-N packets are sampled and forwarded to a collector which can analyze the samples and provide information about the state of the network including a list of data flows, the paths they are taking, their length, etc. However, because the samples must typically be forwarded to the control CPU of the switch, the sFlow technique is limited to a relatively small number of samples, e.g., approximately 300 samples per second. Moreover, the sampling rate must be set a priori and is slow to change. As a result, the sampling rate is forced to be set to a very low rate in order to accommodate high loads, e.g., 1 in approximately 400,000 packets are sampled to handle minimum-sized, e.g., 64 byte, packets at line rate on a 64 port, 10 Gbps switch while keeping the number of samples less than 300 per second.

SUMMARY

In one illustrative embodiment, a method, in a data processing system comprising a processor and a memory, for determining an event rate is provided. The method comprises sampling, by the data processing system, a sequence of events, to generate a set of sampled events. At least a subset of the sampled events in the set of sampled events have associated event sequence values indicating a position of the sampled event within the sequence of events. The method further comprises grouping, by the data processing system, the sampled events into a plurality of event groups based on a common characteristic of the events. Moreover, the method comprises determining, by the data processing system, for each event group, sequence values of sampled events associated with the event group. In addition, the method comprises calculating, by the data processing system, for each event group, an estimated event rate based on the sequence values of the sampled events associated with the event group and the total number of events in the sequence of events.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 is an example diagram illustrating a table of data flows and data packet sequence numbers for data packets received as part of these data flows for two example quanta of time.

DETAILED DESCRIPTION

Figure 1:
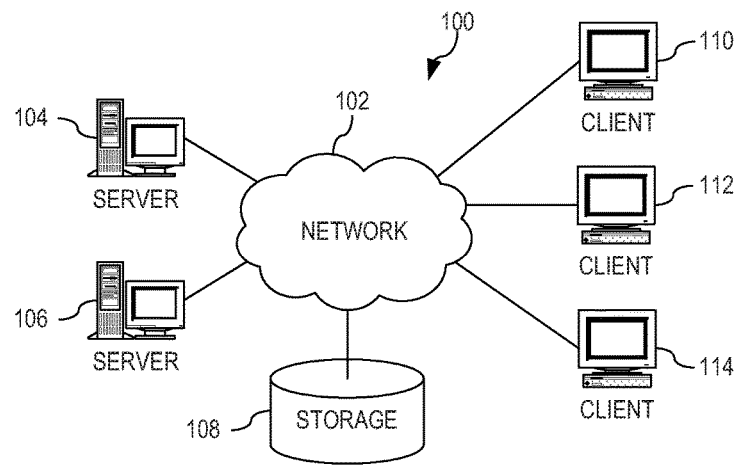
FIG. 1 is an example diagram of a distributed data processing system in which aspects of the illustrative embodiments may be implemented.

The illustrative embodiments provide mechanisms for using port mirroring in network forwarding devices, e.g., switches, routers, or the like, to implement the sampling of data packets for purposes of performing analysis of the data traffic flows and performing operations to report results of the analysis performed, operations to optimize these data traffic flows, operations to perform problem resolution on these data traffic flows, or any other traffic engineering operations. It should be appreciated that while port mirroring is used for debugging purposes in general, the illustrative embodiments employ port mirroring for a different and previously undiscovered purpose of sampling data packets for data traffic analysis and traffic engineering operations.

The illustrative embodiments take advantage of the saturation limits of the ports of the network forwarding device (hereafter referred to simply as a switch for illustrative purposes) for implementing the sampling. The data packet samples are forwarded, via the port(s) to which the data packets are mirrored, to a collector without involving the control plane processor of the switch. As a result, the number of samples that may be collected are dynamic and not limited by a priori specifications of a sampling rate. The number of samples provided during a specified period of time may be dependent upon the amount of data packet traffic encountered over the data flows of the ports that are mirrored to the mirror port(s).

In some illustrative embodiments, one or more ports of a switch are selected to be mirror ports, i.e. ports to which the data packets flowing through the remaining ports of the switch are mirrored. Mirroring comprises performing standard switch port processing of the data packets as they are received/transmitted, but in addition forwarding a copy of the data packet to the designated mirror port(s). In accordance with the illustrative embodiments, the switch logic is configured to implement such port mirroring by designating in the logic which ports of the switch are to be mirrored to which other ports.

The mirror ports are coupled to a sampled data packet collector, which may be implemented on a server or other computing device. The sampled data packet collector (referred to as a "collector" hereafter) collects the sampled data packets that are mirrored to the mirror ports and perform analysis on the sampled data packets. The results of the analysis may be reported to a user, used to perform a traffic engineering operation, or the like.

The illustrative embodiments utilize the saturation of the mirror ports as a mechanism for sampling the data packets received as part of data flows of the other ports of the switch. That is, because of the innate limitations of the port, each port can handle only a specific amount of data packets per unit of time. If this amount of data packets is exceeded, data packets may be dropped. As a result, during light loads, the mirror port will sample all data packets flowing through the other ports that are mirrored to the mirror port. Under heavy loads, a random sampling of data packets is achieved as data packets are randomly dropped as the limitations of the port are periodically reached. Hence a subset of the data traffic flowing through the ports of the switch is collected and forwarded to the collector. However, at all times, this sampling provides at least 1-in-N samples for a N port switch, i.e. 1 in 64 for a 64 port switch as compared to the 1 in 400,000 sampling provided by the sFlow technique mentioned above.

It should be appreciated that, under established standards and documentation, including sFlow as well was documentation from network vendors such as Cisco Systems, it is specifically stated that oversubscription of ports should be avoided, i.e. mirroring multiple ports to a mirror port such that the port limitations are exceeded should not be permitted. The illustrative embodiments specifically disregard this advice and instead utilize such oversubscription and saturation of the mirror ports to perform the sampling of data packets for data flow traffic analysis. Thus, the illustrative embodiments leverage the limitations of port bandwidth to achieve high volume, low latency sampling of data packets from multiple ports of a switch.

It should also be appreciated that this sampling is a true random sampling and not a statistical sampling as used by the sFlow technique. That is, in sFlow, the statistical sampling is akin to rolling a die having N sides and each time a "1" occurs on the rolled die, the corresponding data packet is sampled. To the contrary, the sampling performed by the mechanisms of the illustrative embodiments are not aware of how the particular data packets that are dropped are determined. The packets are dropped whenever the switch's port limit is reached and this is not predicted a priori.

Furthermore, the forwarding of the sampled data packets is done directly from the mirror port to the collector that is coupled to the mirror port. In this way, there is no need to involve the control plane processor of the switch in the forwarding of the sampled data packets for analysis. This eliminates the limitations on numbers of sampled data packets that may be processed per unit time introduced by the relatively slower operating control plane processor. As a result, the mechanisms of the illustrative embodiments provide high sample volume as opposed to the relatively low sample volume of typical implementations of the sFlow technique.

Thus, with the mechanisms of the illustrative embodiments, a network forwarding device (e.g., switch) having N ports is configured such that N−k ports are used for normal data traffic flows, where k is the number of ports of the switch allocated to be mirror ports. The network forwarding device is further configured to mirror the N−k ports to the remaining k ports, i.e. configured to forward copies of data packets flowing through the N−k ports to the remaining k ports. The k ports are coupled to ports of a network adapter of a computing device which implements a collector of the sampled data packets. The network adapter is configured to be in a "promiscuous" mode of operation meaning that the network adapter processes all data packets received rather than only those data packets whose destination identifier matches the network adapter's identifier. In this way, all of the sampled data packets are processed by the collector on this computing device. The collector may then perform various traffic analysis algorithms on the sampled data and generate corresponding output data for reporting, performing traffic engineering operations, or the like.

It should be appreciated that when performing the port mirroring, one drawback is that metadata defining the port over which data packets are received may be lost since the data packets are mirrored to the mirror port and, to the collector, the sampled data packets originate from the mirror port. The illustrative embodiments provide further mechanisms for recovering this metadata from data packet forwarding rules implemented in the switch logic. That is, with the combination of the data packet header information and forwarding rules utilized in the switches themselves, the path that the data packet took to arrive at the switch, and thus which port of the switch the data packet was received through may be determined. That is the network controller, e.g., the SDN controller or the like, may store forwarding rules defining a forwarding tree or other structure for destination nodes (computing devices) of the network. Alternately, the switches in the network can be queried for their forwarding rules, e.g., via a command line interface, REST API or other interface. Knowing the source and destination nodes and the forwarding rules or tree, one can determine from which switch in the network the data packet was received and thus, the port over which the data packet was received.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
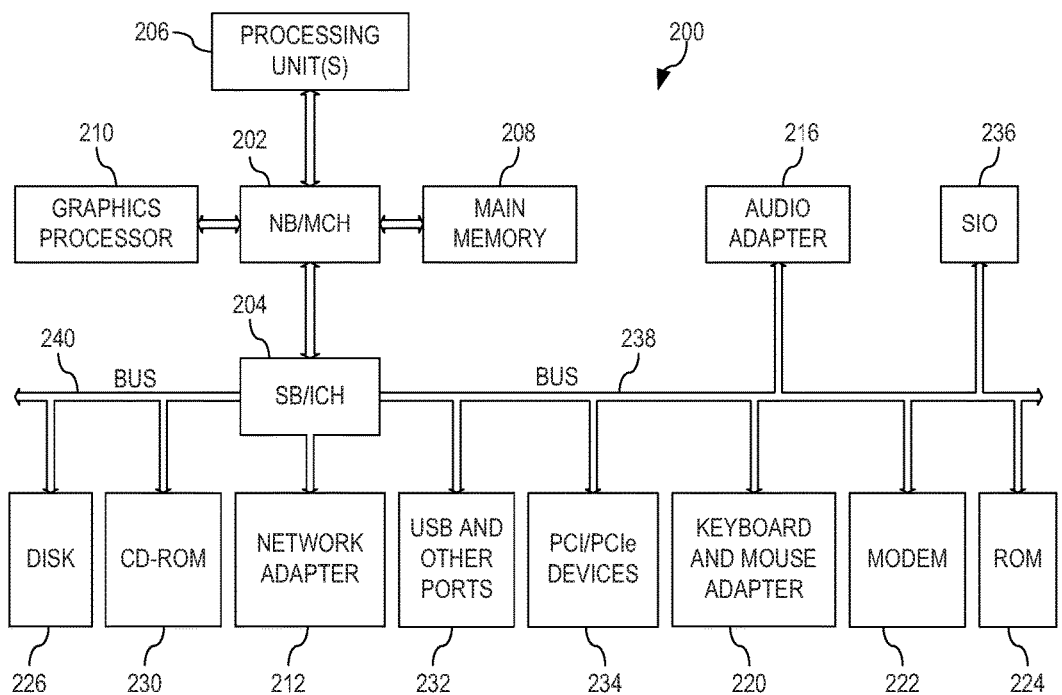
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, the network 102 may comprise a plurality of network forwarding devices, such as switches, routers, or the like, which may be configured in accordance with the mechanisms of the illustrative embodiments to perform port mirroring for sampling of data packet traffic from various data flows through the network forwarding devices. The data flows are between a source device and destination device. Any of the server computing devices 104, 106, the network attached storage 108, or the client computing devices 110-114 may operate as a source or a destination device. Moreover, one or more of the server computing devices 104, 106 may implement software mechanisms for performing sampled data packet collection and analysis, i.e. may implement a sampled data packet "collector." The collector implemented on one or more of the server computing devices 104, 106 may collect sampled data packets from one or more network forwarding devices of the network 102. In addition, one of the server computing devices 104, 106 may implement a network controller, or network manager, such as a Software Defined Networking (SDN) controller. The collector and the network controller may be implemented on the same server computing device 104, 106 in some illustrative embodiments.

In accordance with the illustrative embodiments, when sampling of data packets from data flows flowing through one or more of the network forwarding devices (hereafter assumed to be switches for simplicity of the description) is to be implemented, such as to analyze the data traffic flows for purposes of reporting, performing traffic engineering, or the like, the network administrator or network controller issues a command to the control plane processor of the corresponding switches of interest to initiate port mirroring on the switch. The switch is preferably previously configured, such as by a network controller or network administrator, such that k number of ports of the switch are mirror ports that are coupled to one or more ports of a server computing device 104, 106 implementing the collector. This may involve the k mirror ports being physically or virtually allocated and either directly or indirectly attached to a collector.

Alternatively, the configuring of the switch may be communicated in the command from the network controller indicating which ports are to be mirror ports and which ports are to be mirrored to the mirror ports. The remaining ports may be configured to be mirrored to the mirror ports such that data packets received/transmitted over these ports may be mirrored to the mirror ports and thereby, sampled for sending to the collector. The particular arrangement of which ports are mirrored to each of the mirror ports on a switch may be determined in many different ways depending on the particular desired functionality. Suffice it to say that it is not required that all normal ports (i.e., non-mirror ports) need to be mirrored to one or more mirror ports and the distribution of mirroring of normal ports to mirror ports need not be uniform.

This method of port mirroring allows a configuration such that a desired rate of samples is achieved through the port mirroring, as opposed to a desired sampling rate. Though this approach does not exclude possibly attempting to achieve a desired sampling rate since it bounds the sampling rate to approximately 1 in the number of sampled ports divided by the number of mirror ports. That is, in sFlow and other sampling technologies, typically the sampling rate, i.e. the number of packets sampled within a specified number of total packets, is set a priori before sampling commences. The mechanisms of the illustrative embodiments, on the other hand, configure the port mirroring to achieve a desired sampling size, i.e. number of total samples acquired per unit time. This is because the sampling performed by the port mirroring does not permit the designation of a sampling rate since the sampling rate is dependent upon the load of the data flows flowing through the normal ports. With relatively lighter loads, virtually every data packet will be sampled. With relatively higher loads, many data packets will be dropped and not sampled. However, a number of sampled data packets may be consistently achieved based on a light load assumption on the mirrored port. Furthermore, this approach assures that at least 1 in N (where N is the number of ports of the switch) is sampled assuming any data flow through the normal ports at all.

Having configured the switches for port mirroring, data packets received over a normal port that has been configured to be mirrored to a mirror port are copied and provided to the mirror port. The mirror port has a maximum bandwidth of data packets that it may handle. Thus, as more data packets are received over the normal ports of the switch, this bandwidth may be completely utilized and eventually saturated such that data packets will have to be dropped. The dropping of these data packets, at least to the outside observer, appears to be random in that the outside observer is not aware of the determinations involved in determining which data packets to drop.

Thus, a random sampling of data packets is obtained by the port mirroring and saturation of the mirrored ports. The random sampling of data packets may comprise anywhere from all of the data packets flowing through the normal ports (under light loads that do not saturate the bandwidth of the mirror ports) up to a number of sampled data packets equal to the bandwidth of the mirror ports. This random sampling of data packets is across each of the data flows of the normal ports mirrored to the mirror ports and thus, each data flow may not be sampled uniformly, e.g., if a switch samples uniformly from input ports, then lightly-loaded input ports will be overrepresented as compared to more heavily-loaded input ports. As a result, while the random sampling of data packets achieved through port mirroring may not allow for the characterization of the data flow traffic received versus dropped, other useful characterizations of the data flow traffic are possible such as listing a majority of the flows through the network, service level agreement monitoring, and determining a relative ordering of the size of data flows over given links, e.g., smallest to largest data flows or vice versa. Other useful characterizations of the data flow traffic may also be achieved through the mechanisms of the illustrative embodiments.

The sampled data packets that are received at the mirror ports are forwarded to a collector implemented on a computing device, such as server 104 or 106, for example. The collector computing device may be directly attached to the mirror port(s) of the switch or may be remotely located from the switch (indirectly coupled). In the case of a remotely located collector computing device, the sampled data packets may be sent as encapsulated data packets, e.g., via a GRE tunnel, when the collector computing device is not directly coupled to the mirror port.

The collector collects the sampled data packets and stores them for analysis. The collector may further perform the analysis itself or a separate analysis engine may be utilized to analyze the collected data packets to determine characteristics of the data flow traffic of the network. Various types of analysis may be performed on the sampled data packets including, but not limited to, for example producing a list of data flows in the network and the path they have been observed following, producing lists of the data flows going over individual links and their relative ordering in terms of size, and latencies between switches for data packets sampled at multiple places, and the like.

The results of this analysis may be output to an authorized user, such as via a user's computing device, e.g., client computing device 110, for review and use by the authorized user. In some illustrative embodiments, the results of the analysis may further be utilized by human users or automated systems to implement traffic engineering operations. These traffic engineering operations may take many different forms including load balancing across links in the network by moving data flows from one link to another, such as by changing routing rules implemented by the switches, determining where additional resources should be deployed in the network topology, reconfiguring resources within the network, or the like. In addition to traffic engineering, data flows could be stopped or blocked entirely either to preserve resources or to address potential security threats. This is in addition to other network reactions to network measurement data as they would be known to practitioners of the art.

Figure 3:
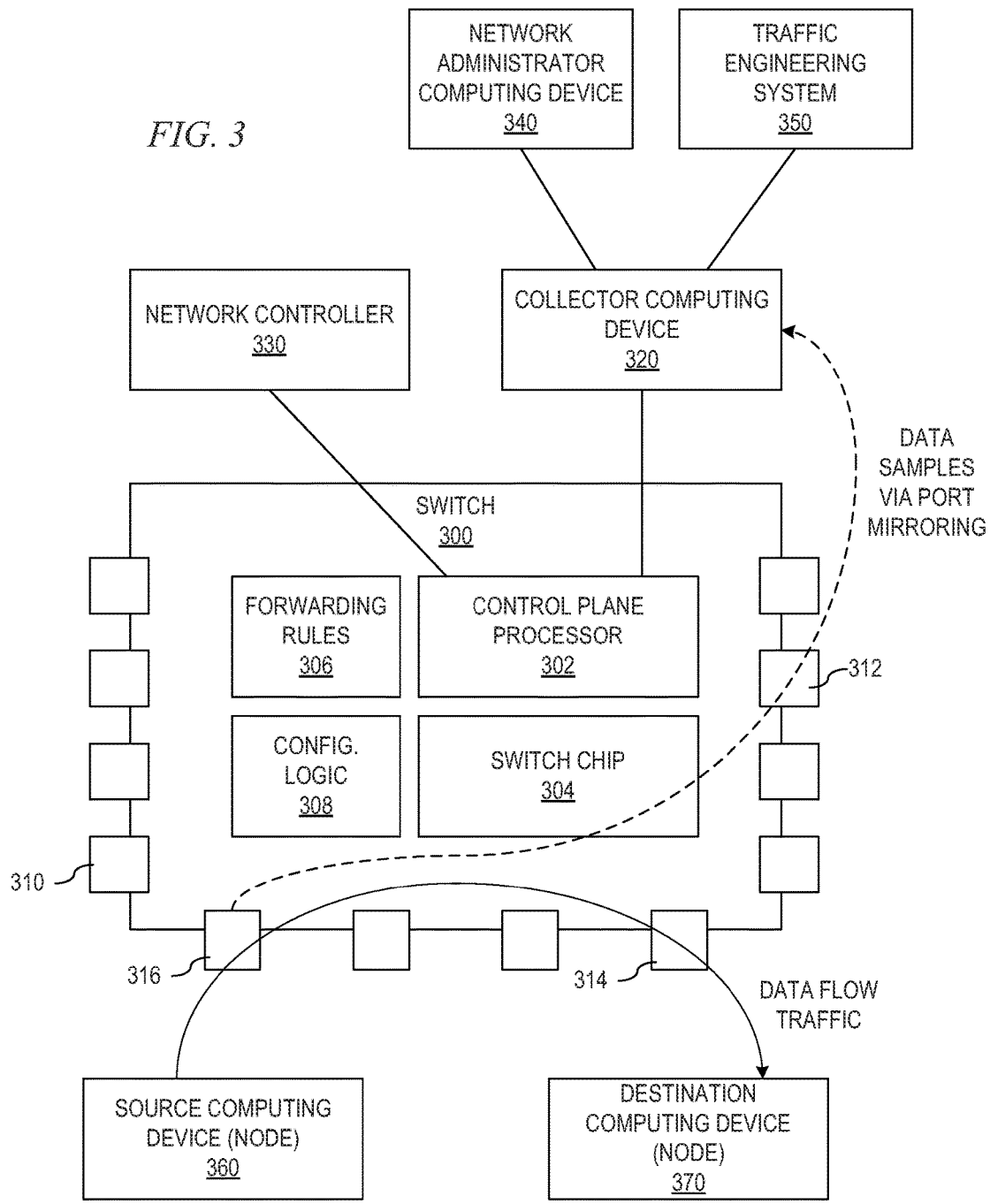
FIG. 3 is an example block diagram illustrating the primary operational elements for sampling of data flows using port mirroring in accordance with one illustrative embodiment.

FIG. 3 is an example block diagram illustrating the primary operational elements for sampling of data flows using port mirroring in accordance with one illustrative embodiment. As shown in FIG. 3, the primary elements comprise a network switch 300 comprising a control plane processor 302, a switch chip 304 in the data plane of the switch 300, forwarding rules data storage 306, configuration logic 308, and a plurality of physical ports 310. The switch 300, in one illustrative embodiment, is a physical device that routes data traffic through a network by receiving data traffic on one of the physical ports 310 and outputting the data traffic on another physical port 310 in accordance with the forwarding rules stored in the forwarding rules data storage 306. In other illustrative embodiments, the switch 300 may be a virtual switch implemented in a physical data processing device. For purposes of the present description, it will be assumed that the switch 300 is a physical switch, however the mechanisms of the illustrative embodiments may be implemented with regard to virtual switches as well without departing from the spirit and scope of the illustrative embodiments. Similarly, references to "ports" in the present description is made with regard physical ports, but the illustrative embodiments are not limited to such. Rather, the mechanisms of the illustrative embodiments may be implemented with regard to virtual ports as well.

The configuration logic 308, among other functions, may implement mechanisms for achieving port mirroring within the switch 300 by configuring the data plane switch chip 304 to copy data packets received on one or more designated ports (normal ports) to one or more other ports (mirror ports). One or more of the ports 310 of the switch may be configured to be mirror ports, e.g., port 312. One or more of the non-mirror ports, i.e. the "normal" ports, 310 may be mirrored to the designated mirror port 312. It is not required that all normal ports of the switch be mirrored to the mirror port 312 and if more than one mirror port 312 is utilized, it is not required that the normal ports be evenly distributed over the plurality of mirror ports 312. It is preferable that the mirroring of the normal ports 310 to the mirror ports 312 is configured in such a way as to oversubscribe the mirror port 312 so as to implement the sampling of the data packets in accordance with the mechanisms of the illustrative embodiments. Thus, the number of normal ports 310 mirrored to each of the mirror ports 312 may be specifically selected to ensure that such oversubscribing of the mirror ports 312 is achieved under desired load conditions.

In addition to the switch 300, the mechanisms of the illustrative embodiments further make use of a collector computing device 320 that collects sampled data packets from the switch 300, stores them, and analyzes the data packets to generate data traffic characteristic information that may be output to a network administrator or other authorized user via the network administrator computing device 340, provided to a traffic engineering system 350 in order to automatically perform traffic engineering operations, such as load balancing of links, deployment of resources, reconfiguration of resources, or the like.

A network controller 330 is also depicted in FIG. 3 and may be utilized to initiate the configuring of the switch 300 for port mirroring by sending a command to the switch 300 to being such port mirroring. This command may cause the switch to implement an already defined configuration in the configuration logic 308 for implementing this port mirroring or may designate the particular configuration in the command itself, e.g., which normal ports are to be mapped to which mirror ports in the switch 300. It should be appreciated that rather than using a network controller 330 to initiate such configuring of the switch 300, the collector computing system 320 or the network administrator may instead be the primary agent for initializing such configuring and may issue commands to the switches of the network to perform such configuring. This is depicted by the network link between the collector computing system 320 and the control plane processor 302 of the switch 300 in FIG. 3.

As shown in FIG. 3, data packet traffic flows between a source computing device 360 and a destination computing device 370 via the physical ports 310 of the switch 300. It should be noted that while the source and destination computing devices are shown both connected to the same switch, this is not required and they may be attached to two distinct switches. The forwarding rules in the forwarding rules data storage 306 are used by the switch chip 304 to analyze the header of received data packets to determine at least a destination of the received data packet, and in some cases a 5-tuple comprising the source identifier, destination identifier, source port, destination port, and protocol, and identify a corresponding forwarding rule for the data packet. The forwarding rule identifies which physical port, e.g., port 314, to forward the data packet to in order to route the data packet to the destination computing device 370. Thus, data packets flow through the switch 300 from a receive port 316 to a transmit port 314 based on the forwarding rules.

In addition, in accordance with the mechanisms of the illustrative embodiments, if the switch 300 is configured by the configuration logic 308 to implement port mirroring, such as in response to a command from the network controller 330, data packets received at the receive port 316 may also be mirrored, or copied, to a mirror port 312 without going through processing by the control plane processor 302. Since the port mirroring does not require processing by the control plane processor 302, the latency associated with the processing by the control plane processor 302 is avoided. Instead the data packets are mirrored, or copied, to the mirror port 312 and sampled by the mirror port 312 by virtue of the mirror port 312 maximum bandwidth. While it is noted that this port mirroring offers advantages by avoiding the control plane processor 302, it should also be noted that the control plane processor 302 could be involved in the processing of mirrored traffic as well in some embodiments.

If data packets mirrored to the mirror port 312 exceed the maximum bandwidth of the mirror port 312, then data packets are dropped randomly. The data packets that are not dropped are forwarded to the collector computing system 320 which is associated with the mirror port 312 by virtue of a direct or indirect network link to the mirror port 312. That is, while FIG. 3 shows the collector computing system 320 being directly linked to the mirror port 312, such as via an Ethernet link or the like, such is not required and the collector computing system 320 may in fact be remotely located and accessible via one or more other network connections. In such a case, the mirrored data packets may be encapsulated in another packet with header information for routing the data packet to the collector computing system 320 via these other network connections.

The collector computing system 320 collects the sampled data packets received via the mirror port 312 and stores them for analysis. The collector computing system 320 may further perform such analysis itself and generate results of this analysis or invoke the operation of another computing device to perform such analysis. The various analyses performed by the collector computing system 320, or other analysis computing device, may take many different forms but generally will result in one or more characterizations of the data flow traffic flowing through the network, and in this particular example, through the switch 300. The results of the analysis may be provided to a user or automated mechanism to perform further operations based on the results of the analysis. For example, the collector computing system 320 may output the results of the analysis to a user via the network administrator computing device 340. As another example, a traffic engineering computing system 350 may be provided for performing various traffic engineering operations to optimize or modify the operation of the network and its resources based on the results of the analysis performed by the collector computing system 320.

As discussed above, one of the primary features of the illustrative embodiments is the ability of the port mirroring mechanisms of the illustrative embodiments to take advantage of the saturation limits, e.g., maximum bandwidth, of the ports 310 of the switch 300 for implementing the sampling and to do so without involving any processing of the data packets by a control plane processor 306 of the switch 300. As a result of the sampling being dependent upon the amount of traffic flowing through the ports 310 of the switch 300 and the maximum bandwidth of the mirror port(s), the number of samples that may be collected by the collector computing system 320 is dynamic and not limited by a priori specifications of a sampling rate. The number of samples provided during a specified period of time may be dependent upon the amount of data packet traffic encountered over the data flows of the ports that are mirrored to the mirror port(s). The port mirroring is configured to mirror a sufficient number of normal ports to mirror ports so as to ensure that the saturation limit of the mirror ports is achieved under specific traffic flow conditions, i.e. the mirror ports are purposefully oversubscribed.

In particular, in one illustrative embodiment, the switch 300 may have N number of ports of which k ports are designated through the configuring of the switch 300 to be mirror ports 312. In the depicted example, N would be 12 and k would be 1 but in reality switches 300 may have any number of ports and any number of these ports may be selected to be mirror ports, although it is preferable that k be substantially smaller than N to ensure oversubscribing of the k mirror ports 312 and reducing the number of ports that are given up for monitoring purposes, and thus not available for data forwarding. Thus, the switch 300 is configured such that N−k ports are used for normal data traffic flows. The switch 300 is further configured to mirror the N−k ports 310 to the remaining k ports 312. The k ports 312 are coupled to ports of a network adapter of the collector computing system 320. In one illustrative embodiment, the network adapter of the collector computing system 320 is configured to be in a "promiscuous" mode of operation meaning that the network adapter processes all data packets received rather than only those data packets whose destination identifier matches the network adapter's identifier. In this way, all of the sampled data packets are processed by the collector computing system 320. Alternatively, if the collector computing system 320 is remotely located from the switch 300 and not directly connected via a network link to mirror port 312, the sampled data packets may be encapsulated with header information indicating the collector computing system 320 as a destination, in which case it does not become necessary to set the network adapter of the collector computing system 320 to a promiscuous mode of operation.

As mentioned above, one drawback to port mirroring is that metadata defining the port over which data packets are received, e.g., receive port 316, may be lost since the data packets are mirrored to the mirror port 312 and, to the collector computing system 320, the sampled data packets originate from the mirror port 312. The illustrative embodiments provide further mechanisms and logic for recovering this metadata from data packet forwarding rules stored in the forwarding rules data storage 306 and implemented in the switch chip 304 logic. That is, with the combination of the data packet header information and forwarding rules, the path that the data packet took to arrive at the switch 300, and thus which port 316 of the switch 300 the data packet was received through, may be determined. The network controller 330, e.g., the SDN controller or the like, may store forwarding rules defining a forwarding tree for destination nodes, e.g., destination computing device 370, of the network. Alternatively, these forwarding rules may be obtained from the switch itself. Knowing the source and destination nodes 360 and 370, and the forwarding rules or tree, the collector computing system 320 can determine from which switch or computing device in the network the data packet was received and thus, the port 316 over which the data packet was received.

Figure 4:
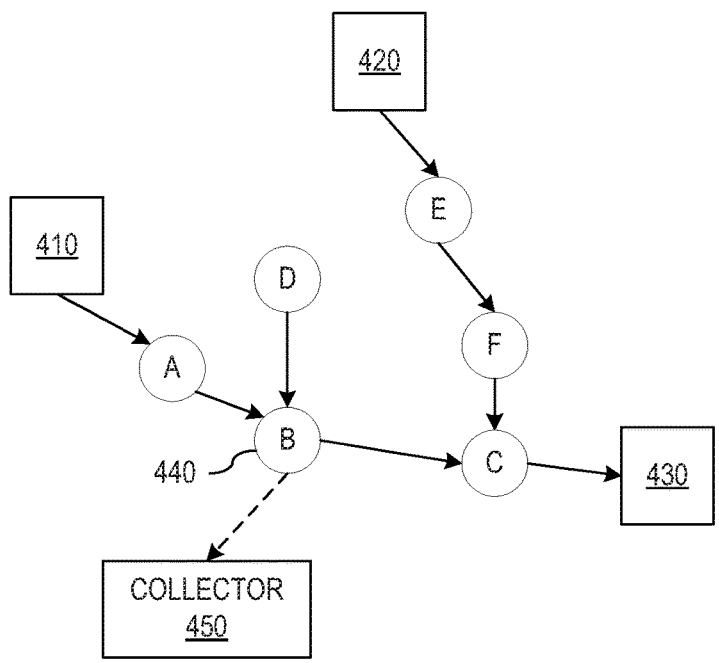
FIG. 4 illustrates a scenario in which the metadata regarding the port over which a data packet was received may be deduced from header information and forwarding rules in accordance with one illustrative embodiment.

FIG. 4 illustrates a scenario in which the metadata regarding the port over which a data packet was received may be deduced from header information and forwarding rules in accordance with one illustrative embodiment. As shown in FIG. 4, data packets may flow from either of source nodes (computing devices) 410 or 420 to destination node 430 via a plurality of network switches 440 labeled A-F in this example. The header of the data packets indicate the source and destination of the data packet. This information may be correlated with forwarding rules utilized by the switches 440 of the network to deduce the path that the data packet took to arrive at its current place in the data flow from the source node 410 to the destination node 430. From this, the port of the switch 440 at which the data packet was sampled may be identified.

For example, assume that the collector computing system 450 receives a sampled data packet from switch B which implements the port mirroring mechanisms of the illustrative embodiments. Also assume that the sampled data packet comprises header information that indicates its source to be source node 410 and its destination to be destination node 430. The collector computing system 450 may obtain forwarding rules from switches A-F, or from a network controller, such as network controller 330 in FIG. 3. The forwarding rules are specified in terms of at least a destination node identifier, in some instances in terms of a tuple, such as a 5-tuple comprising the source identifier, destination identifier, source port, destination port, and protocol, and possibly other rule formats. The forwarding rules further specify one or more output port for the particular switch based on the application of the forwarding rule to the data packet such that the corresponding switch will output the data packet on the designated port(s) of the switch.

Looking at the currently applicable forwarding rules used in the network switches, one trace the path of the data packet from its source through the switches to the current switch B. Thus, in the depicted example, it can be determined that the data packet from source node 410 was received by switch A and then forwarded to switch B from switch A. Knowing this information, the collector computing system 450 may determine that port X is connected to switch A and thus, the sampled data packet was received via port X of switch B. Thus, using the headers of the sampled data packets, and correlating them with the currently applicable forwarding rules, the collector computing system 450 is able to recover the receive port metadata for the sampled data packet and may utilize this information when performing analysis of the sampled data packets. In particular, this metadata allows for any device performing analysis on the sampled packet to know the links which the packet traversed. Thus, it is possible to establish which data flows cross which links and also their relative ordering in size based on the number of samples from each in a given time window, among other applications.

It should be appreciated that the forwarding rules used by the switches in the network may be static or dynamic in nature. In the case of dynamic forwarding rules, such as when a SDN controller periodically issues new forwarding rules to the switches of the network, in order to perform such receive port metadata recovery operations as described above, the collector computing system 450 must further know which forwarding rules were in effect at the time that the data packet was received at the switch, since these forwarding rules may have since been changed. As such, timestamp information may be associated with the data packets indicating when the data packets were received at the receive port of the switch. This timestamp information may be correlated with the forwarding rules available from the network controller, e.g., SDN controller, to determine which forwarding rules were in effect at the time the sampled data packet was received.

It should be appreciated that while FIG. 3 illustrates the collector computing system 320 being coupled to a single switch 300 for ease of the present description, the illustrative embodiments are not limited to such. To the contrary, a plurality of switches of a network topology may be configured to perform port mirroring in accordance with the illustrative embodiments and the sampled data packets obtained through such port mirroring may all be provided to the same collector computing system 320. Alternatively, multiple collector computing systems 320 may be utilized. Moreover, while the various elements 300, 320, 330, 340, 350, 360, and 370 shown in FIG. 3 are illustrated as being directly coupled to one another, this is done for illustration purposes only and the present invention is not limited to such. To the contrary, each of these elements may be remotely located from each other, or a subset of these elements may be remotely located from another subset of these elements without departing from the spirit and scope of the illustrative embodiments. Furthermore, while the switch 300 is shown as having a particular configuration of sub-elements including control plane process 302, switch chip 304, physical ports 310, etc., this is only for illustration purposes and it should be appreciated that the mechanisms of the illustrative embodiments may be implemented in any network forwarding device, e.g., switch, router, or the like, that is able to implement port mirroring in accordance with the illustrative embodiments.

Figure 5:
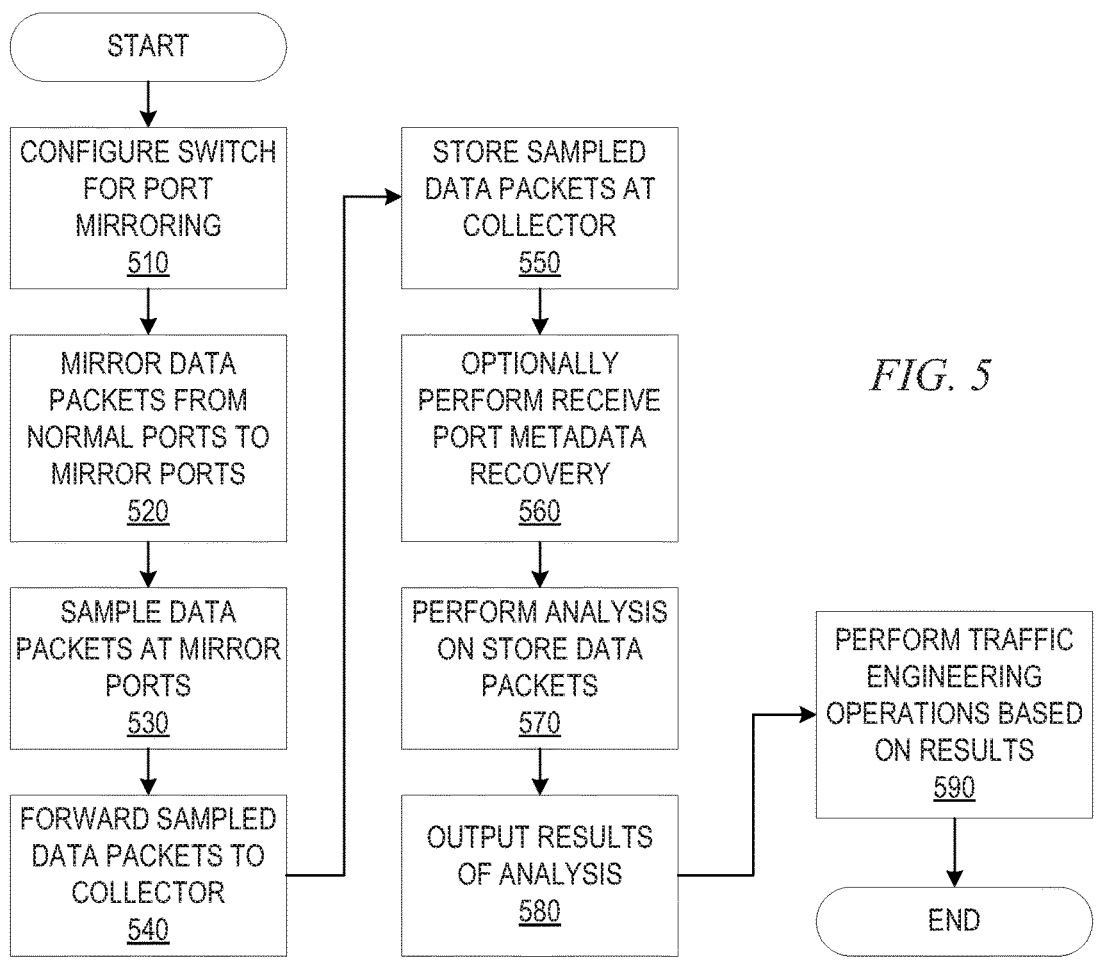
FIG. 5 is a flowchart outlining an example operation for performing data traffic analysis of a network in accordance with one illustrative embodiment.

FIG. 5 is a flowchart outlining an example operation for performing data traffic analysis of a network in accordance with one illustrative embodiment. While the operation outlined in FIG. 5 will make reference to a single switch, it should be appreciated that the operation outlined in FIG. 5 may be performed with regard to a plurality of switches of a network.

As shown in FIG. 5, the operation starts by configuring a switch to implement port mirroring for purposes of sampling data packets on ports of the switch (step 510). The configuring of the switch involves configuring the switch so that N−k ports are used for normal data traffic and are mirrored to the k mirror ports. Data packets received over the normal ports of the switch are mirrored to the mirror ports (step 520). The mirror ports sample the data packets in accordance with their bandwidth limitations (step 530) and forward the sampled data packets to a collector (step 540). The collector collects the sampled data packets and stores them for analysis (step 550). Optionally, the collector may perform receive port metadata recovery operations based on the headers of the data packets and the forwarding rules applicable at the time of the receipt of the data packet (step 560). The collector may then perform analysis on the stored sampled data packets to identify one or more data flow traffic characteristics (step 570). The results of the analysis comprising the one or more data flow traffic characteristics may be output to a user and/or a traffic engineering system (step 580). One or more traffic engineering operations may then be performed based on the results of the analysis (step 590) and the operation terminates.

Thus, the illustrative embodiments provide mechanisms for leveraging port saturation and port mirroring mechanisms of a network forwarding device to achieve a random sampling of data flow traffic through the network forwarding device. The amount of data sampled is greatly increased due to the bandwidth of the mirror ports from which the data is received by the collector computing system. Moreover, latency in sampling data packets is reduced since the port mirroring circumvents the control plane processors of the network forwarding device. As a result, a low latency, high volume sampling mechanism is achieved.

As mentioned above, the mechanism of the illustrative embodiments provide a random sampling of data packets from the various data flows flowing through the normal ports of the switch that are mirrored to the mirror port(s). This random sampling does not have a prior set sampling rate contrary to known mechanisms, such as sFlow. With sFlow, or other sampling mechanisms, a sampling rate is set a priori and is used to select data packets to be sampled. Thus, for example, if the sample rate is 1 in 10 data packets being sampled, and 12 data packets are sampled, it can be deduced that 120 data packets were likely transmitted. In other words, having fixed sampling rates know a priori allows certain conclusions about the broader traffic rate to be made based on the samples. Such is not the case with a random sampling of data packets without a set sampling rate, as in the mechanisms of the illustrative embodiments.

In order to address such limitations, the illustrative embodiments provide further mechanisms for inferring a sampling rate based on an analysis of the sampled data packets and a determination of the number of missing data packets within a quantum of time, as described hereafter.

The illustrative embodiments utilize sequence numbers associated with sampled data packets of some data flows to determining the most likely total number of data packets received for each data flow. The ratio of the determined total number of data packets that were likely received to the number of data packets sampled is used to determine a sampling rate for the data flow during the particular quantum of time. From the total number of data packets received from all of the data flows and the total number of sampled data packets, a sampling rate for the entire quantum of time across all the flows may be determined. This sampling rate may be multiplied by the number of data packets received by the collector computing system for the quantum of time, which includes data packets that do not have sequence numbers and/or cannot be associated with a particular data flow, to estimate the total number of packets received during that quantum of time.

For subsequent quanta of time, the highest sequence number for each data flow seen in an immediately preceding quantum of time is used to adjust the calculation of the sampling rate for each data flow, the total data flow, and the estimated total number of packets received. That is, the highest sequence number for a previous quantum of time is subtracted from the highest sequence number for the current quantum of time, for each data flow, to determine the likely total number of data packets for that data flow that were received during the present quantum of time. Note that for some packets the sequence numbers may not be in packets, but in bytes (e.g., for TCP) or some other unit. As long as there is a rough correspondence between these units and packets, the sampling rate can be inferred. These values are used to calculate the ratios previously mentioned above to generate sampling rates for each of the data flows. In addition, these values are accumulated to determine a likely total number of data packets received over the quantum of time which can then be used to calculate the total sampling rate for the present quantum of time. The total sampling rate may then be multiplied by the number of packets received by the collector computing system, both those with sequence numbers and data flow identifiers and those without, to determine an estimate of the total number of packets received during the present quantum of time. This process may be repeated for each subsequent quantum of time.

With such mechanisms, the illustrative embodiments estimate true data rates of data flows and links with near-perfect accuracy when sequence numbers are provided in terms of bytes and high accuracy when sequence numbers are in terms of packets. The sampling rates can be calculated from the estimates of the true data rates and used to obtain a good estimate of all other traffic, e.g., traffic not having sequence numbers or not able to be associated with any particular data flow.

FIG. 6 is an example diagram illustrating a table of data flows and data packet sequence numbers for data packets received as part of these data flows for two example quanta of time. These data packets may be data packets that were sampled via the port mirroring mechanisms previously described above, for example.

As shown in FIG. 6, during a first quantum of time, data packets are received for three different data flows 1-3. Data packets may be associated with particular data flows based on the header information of the data packets. This may be as simple as the data flows being identified based on destination node identifier, a combination of source and destination node identifiers, or a more complex determination based on a tuple, such as a 5-tuple, as previously discussed above. In addition, the received data packets may or may not have associated sequence numbers. As shown in FIG. 6, the majority of the data packets have corresponding sequence numbers although a few, shown with "-" in the entries of the table, either do not have sequence numbers or could not be associated with a particular data flow for one reason or another. This may occur, for example, with Ethernet traffic that has an unknown packet format, or DNS requests which have a transaction ID, but the IDs are not guaranteed to be ordered.

In the depicted example, during quantum of time 1, the highest sequence number data packet received for data flow 1 was 7 and 4 total data packets were sampled. For data flow 2, the highest sequence number was 3 and 2 data packets were sampled. For data flow 3, 1 data packet was sampled and the highest sequence number was 7. These values are used to calculate a sampling rate for each of the data flows as the ratio of the highest sequence number to the number of data packets sampled. Thus, the sampling rate for data flow 1 is 7/4=1.75, i.e. 1 in 1.75 data packets are sampled from data flow 1. The sampling rate for data flow 2 is 3/2=1.5, i.e. 1 in 1.5 data packets are sampled from data flow 2. The sampling rate for data flow 3 is 1/1=1, i.e. 1 in 1 data packets are sampled from data flow 3. The total number of data packets sampled and the total of the highest sequence numbers for each of the data flows may be used to generate a sampling rate for the quantum using a similar ratio of total highest sequence number to total number of sampled data packets, e.g., 11/7~=1.57, i.e. 1 in 1.57 data packets were sampled across all of the data flows. This total sampling rate may be multiplied by the total number of packets sampled, including those that could not be correlated with a data flow or that do not have sequence numbers, to generate an estimate of the total number of data packets received during quantum of time 1, e.g., 8*1.57=12.56. Thus, in this example, it is estimated that during quantum of time 1, 12.56 data packets were received by the switch from which the data packets were sampled. Note that it may prove more fruitful to conduct this analysis per-port on a switch, or equivalently per-link, as the actual sampling rate tends to vary per-link rather than per-switch as a whole. To do this, the packet is associated with an input port or link either from explicit metadata in systems that provide this, e.g., sFlow, or by inference from forwarding rules as discussed previously.

This calculation can be done for the first quantum of time in a series of quanta of time. Calculations for subsequent quanta of time are adjusted to take into consideration the number of data packets received during an immediately preceding quantum of time. For these subsequent quanta of time, the highest sequence number for a data flow in an immediately preceding quantum of time is subtracted from the current highest sequence number in the current quantum of time so as to obtain an estimate as to the number of data packets likely to have been received over that data flow during the present quantum of time.

Thus, for example, in quantum 2 of FIG. 6, only 1 data packet form data flow 1 was sampled and it had a sequence number of 24. The highest sequence number for data flow 1 during quantum 1 was 7. Thus, it is estimated that the data rate of data flow 1 during quantum 2 is 24-7 or 17 data packets being received by the switch over data flow 1 during the quantum 2. Similarly, for data flow 2 the data rate is determined to be 13-3=10 and for data flow 3 the data rate is determined to be 17-7=10. These adjusted values of data rates for quantum 2 are used to calculate the sampling rates in a similar manner as described above for quantum 1, e.g., the ratio of the adjusted data rate value to the total number of packets sampled during the quantum of time, e.g., 17/1 for data flow 1 which gives a sampling rate of 1 in 17, 10/2 for data flow 2 which gives a sampling rate of 1 in 5, and the same for data flow 3. These again may be used to determine a total sampling rate for quantum 2 across all of the data flows giving, in this example, 37/5=1 in 7.4. This value may be multiplied by the total number of data packets sampled to generate the estimated total number of packets received by the switch during quantum 2 as 6*7.4=44.4 data packets.

The collector computing system may implement such calculations and logic in the analysis performed by the collector on the sampled data packets. The collector computing system may store data structures, such as the table data structure shown in FIG. 6, as well as the highest sequence numbers for immediately previous quanta of time, and other data values to facilitate these calculations.

Figure 7:
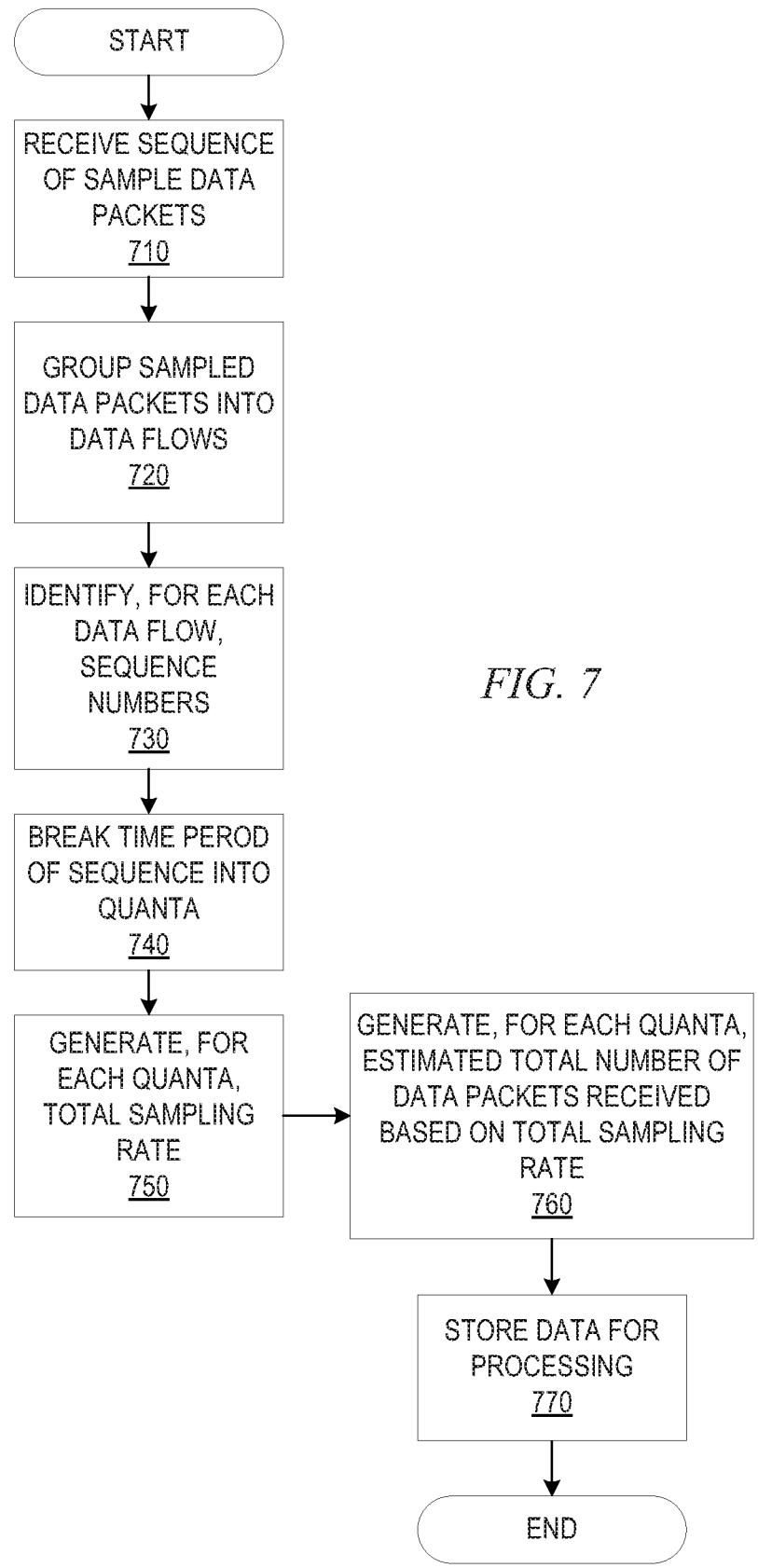
FIG. 7 is a flowchart outlining an example operation for inferring a sampling rate and total number of data packets received per quantum of time in accordance with one illustrative embodiment.

FIG. 7 is a flowchart outlining an example operation for inferring a sampling rate and total number of data packets received per quantum of time in accordance with one illustrative embodiment. As shown in FIG. 7, the operation starts by receiving a sequence of sampled data packets (step 710). The sampled data packets are grouped into data flows (step 720). As mentioned above, this grouping may be performed based on destination identifier, source and destination identifier, a tuple such as a 5-tuple of source, destination, source port, destination port, and protocol, or the like. Within each flow, the sequence numbers of the data packets associated with the flows are identified (step 730). The time period associated with the sequence of data packets is broken into quanta (step 740) and a total sampling rate, for each quantum, across all data flows is calculated based on the ratio of total of highest sequence numbers to total number of data packets sampled (taking into account highest sequence numbers from an immediate previous quantum for quanta subsequent to the first quantum) (step 750). The total sampling rate, for each quantum, is multiplied by the total number of data packets sampled during the particular quantum to determine a estimated total number of data packets received during that particular quantum (step 760). This data is stored for further analysis (step 770) and the operation terminates.

In one illustrative embodiment, this mechanism may be used to check the configuration of sampling mechanisms to ensure that the sampling mechanisms are actually sampling at a requested sampling rate. For example, with the sFlow sampling standard, it is conceivable that a user may configure the sFlow mechanisms to sample data packets at a sampling rate that is higher than can be achieved by the hardware mechanisms. The mechanisms of the illustrative embodiments may be used to estimate the actual sampling rate and compare it to the configured or requested sampling rate to see if the hardware/software mechanisms are sampling data packets at the requested sampling rate. If not, then a notification may be generated and transmitted to a user or otherwise logged for later use in determining how to reconfigure the sFlow mechanism. The same can be done for other types of sampling based mechanisms.

It should be appreciated that while the above mechanisms described with regard to FIGS. 6 and 7 are described as being used to determine a sampling rate for sampling of data packets and an estimate of the total number of packets received during a quantum of time, the illustrative embodiments are not limited to such. Rather, these mechanisms may be used to estimate the rate and total number of any type of event. That is, the event rate and the total number of events during a quantum of time may be estimated using the mechanisms of the illustrative embodiments as long as the events have some sort of sequence identifier associated with them that can be used to perform the estimation. Such events may include customers being served in a store or other service environment where sequential numbers are issued to customers to ensure that customers are served in the order they arrived, but not all customers take numbers, e.g., during less busy times. Such events may include incidents of disease in a population using social security numbers as sequence numbers as they have historically, but less so recently, been issued in order. Still any other events having associated ordered values identifying the events may be the basis for such operations of the illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for determining an estimated data packet rate, the method comprising:
   receiving, from a network forwarding device, a set of sampled data packets from a sequence of data packets, via a mirror port of the network forwarding device, at least by performing a mirroring of data packets from a plurality of normal ports of the network forwarding device to the mirror port of the network forwarding device from which the data packets are randomly sampled as a result of a number of data packets mirrored to the mirror port exceeding a saturation limit of the mirror port, to generate the set of sampled data packets, wherein at least a subset of the sampled data packets in the set of sampled data packets have associated data packet sequence values indicating a position of the sampled data packets within the sequence of data packets;
   grouping, by the data processing system, the sampled data packets of the set of sampled data packets into a plurality of data packet groups based on a common characteristic of the data packets;
   determining, by the data processing system, for each data packet group, sequence values of sampled data packets associated with the data packet group; and
   calculating, by the data processing system, for each data packet group, an estimated data packet rate based on the sequence values of the sampled data packets associated with the data packet group and the total number of data packets in the sequence of data packets.

2. The method of claim 1, wherein the sequence of data packets corresponds to a quantum of time in a series of quanta of time, and wherein the method is implemented for each quantum of time in the series of quanta of time.

3. The method of claim 1, wherein the network forwarding device is a network switch or network router, and wherein the data packet groups are data flows through normal ports of the network switch or network router from which the data packets are sampled.

4. The method of claim 1, wherein the estimated data packet rate is a sampling rate for sampling data packets of the sequence of data packets, and wherein the method further comprises:
   verifying an operation of a data packet sampling algorithm based on the calculated estimated sampling rate.

5. The method of claim 1, wherein the network forwarding device is a switch and wherein the switch comprises a plurality of normal ports that are configured to be mirrored to the mirror port.

6. The method of claim 1, wherein calculating an estimated data packet rate comprises:
   determining for each data packet group, an estimate of a total number of data packets in the data packet group based on the sequence values of the sampled data packets in the corresponding data packet group;
   combining, across the data packet groups, the estimates of a total number of data packets in the data packet groups to generate a sum total estimate of data packets in the sequence of data packets;
   determining a total number of sampled data packets sampled from the sequence of data packets;
   calculating a sampling rate for the sequence of data packets based on a relationship of the sum total estimate of data packets in the sequence of data packets to the total number of sampled data packets sampled from the sequence of data packets; and
   determining the estimated data packet rate based on the sampling rate for the sequence of data packets.

7. The method of claim 6, wherein determining the estimated data packet rate based on the sampling rate for the sequence of data packets comprises calculating an estimate of a total number of data packets in the sequence of data packets based on a mathematical product of the sampling rate for the sequence of data packets and the total number of sampled data packets sampled from the sequence of data packets.

8. The method of claim 6, wherein the sequence of data packets corresponds to a quantum of time in a series of quanta of time, wherein the method is implemented for each quantum of time in the series of quanta of time, and wherein the method adjusts the determination of the estimated data packet rate for each subsequent quantum of time based on the sequence values of data packets in one or more of the previous quanta.

9. A computer program product comprising a non-transitory computer readable medium having a computer readable program stored therein, wherein the computer readable program, when executed on a computing device, causes the computing device to:

receive, from a network forwarding device comprising a plurality of normal ports and a mirror port, a set of sampled data packets from a sequence of data packets via the mirror port, wherein data packets of the set of sampled data packets are randomly sampled as a result of a number of data packets mirrored to the mirror port exceeding a saturation limit of the mirror port, and wherein at least a subset of data packets in the sequence of data packets have associated data packet sequence values indicating a position of the data packet within the sequence of data packets;

group the data packets into a plurality of data packet groups based on a common characteristic of the data packets;

determine, for each data packet group, sequence values of sampled data packets associated with the data packet group; and calculate, for each data packet group, an estimated data packet rate based on the sequence values of the sampled data packets associated with the data packet group and the total number of data packets in the sequence of data packets.

10. The computer program product of claim 9, wherein the sequence of data packets corresponds to a quantum of time in a series of quanta of time, and wherein the method is implemented for each quantum of time in the series of quanta of time.

11. The computer program product of claim 9, wherein the network forwarding device is a network switch or network router, and wherein the data packet groups are data flows through normal ports of the network switch or network router from which the data packets are sampled.

12. The computer program product of claim 11, wherein the estimated data packet rate is a sampling rate for sampling data packets of the sequence of data packets, and wherein the computer program product further causes the computing device to:

verify an operation of a data packet sampling algorithm based on the calculated estimated sampling rate.

13. The computer program product of claim 11, wherein the network forwarding device is a switch, and wherein the switch comprises a plurality of normal ports that are configured to be mirrored to the mirror port.

14. The computer program product of claim 9, wherein the computer program product causes the computing device to calculate an estimated data packet rate at least by:

determining for each data packet group, an estimate of a total number of data packets in the data packet group based on the sequence values of the sampled data packets in the corresponding data packet group;

combining, across the data packet groups, the estimates of a total number of data packets in the data packet groups to generate a sum total estimate of data packets in the sequence of data packets;

determining a total number of sampled data packets sampled from the sequence of data packets;

calculating a sampling rate for the sequence of data packets based on a relationship of the sum total estimate of data packets in the sequence of data packets to the total number of sampled data packets sampled from the sequence of data packets; and determining the estimated data packet rate based on the sampling rate for the sequence of data packets.

15. The computer program product of claim 14, wherein the computer readable program causes the computing device to determine the estimated data packet rate based on the sampling rate for the sequence of data packets comprises calculating an estimate of a total number of data packets in the sequence of data packets based on a mathematical product of the sampling rate for the sequence of data packets and the total number of sampled data packets sampled from the sequence of data packets.

16. The computer program product of claim 14, wherein the sequence of data packets corresponds to a quantum of time in a series of quanta of time, wherein the computer readable program is executed by the computing device for each quantum of time in the series of quanta of time, and wherein the computer readable program further causes the computing device to adjust the determination of the estimated data packet rate for each subsequent quantum of time based on the sequence values of data packets in one or more of the previous quanta.

17. A system comprising:

a processor; and a memory coupled to the processor, wherein the memory comprises instructions which, when executed by the processor, cause the processor to:

receive, from a network forwarding device comprising a plurality of normal ports and a mirror port, a set of sampled data packets from a sequence of data packets via the mirror port, wherein data packets of the set of sampled data packets are randomly sampled as a result of a number of data packets mirrored to the mirror port exceeding a saturation limit of the mirror port, and wherein at least a subset of data packets in the sequence of data packets have associated data packet sequence values indicating a position of the data packet within the sequence of data packets;

group the data packets into a plurality of data packet groups based on a common characteristic of the data packets;

determine, for each data packet group, sequence values of sampled data packets associated with the data packet group; and calculate, for each data packet group, an estimated data packet rate based on the sequence values of the sampled data packets associated with the data packet group and the total number of data packets in the sequence of data packets.

18. The method of claim 1, further comprising:

receiving, by the network forwarding device, a sequence of data packets via the plurality of normal ports;

mirroring, by the network forwarding device, data packets of the sequence of data packets to the mirror port;

dropping, by the network forwarding device, data packets that exceed the saturation limit of the mirror port such that the data packets not dropped are the set of sampled data packets; and transmitting, by the network forwarding device, the set of sampled data packets to the data processing system.

19. The computer program product of claim 1, wherein a portion of the computer readable program is executed by the network forwarding device, and wherein the portion of the computer readable program causes the network forwarding device to:

receive a sequence of data packets via the plurality of normal ports;

mirror data packets of the sequence of data packets to the mirror port;
drop data packets that exceed the saturation limit of the mirror port such that the data packets not dropped are the set of sampled data packets; and
transmit the set of sampled data packets to the data processing system.

20. The system of claim 17, further the network forwarding device, wherein the network forwarding device operates to:
receive a sequence of data packets via the plurality of normal ports;
mirror data packets of the sequence of data packets to the mirror port;
drop data packets that exceed the saturation limit of the mirror port such that the data packets not dropped are the set of sampled data packets; and
transmit the set of sampled data packets to the data processing system.

* * * * *